US012681441B2

(12) United States Patent
Bottero et al.

(10) Patent No.: US 12,681,441 B2
(45) Date of Patent: Jul. 14, 2026

(54) CONSTRAINED CONTROLLING OF A COMPUTER-CONTROLLED SYSTEM

(71) Applicant: Robert Bosch GmbH, Stuttgart (DE)

(72) Inventors: Alessandro Giacomo Bottero, Stuttgart (DE); Carlos Enrique Luis Goncalves, Stuttgart (DE); Felix Berkenkamp, Munich (DE); Jan Peters, Seeheim-Jugenheim (DE); Julia Vinogradska, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 338 days.

(21) Appl. No.: 18/331,751

(22) Filed: Jun. 8, 2023

(65) Prior Publication Data

US 2024/0012368 A1      Jan. 11, 2024

(30) Foreign Application Priority Data

Jul. 11, 2022     (EP) ..................................... 22184158

(51) Int. Cl.
*G05B 13/02*              (2006.01)
(52) U.S. Cl.
CPC ....... *G05B 13/021* (2013.01); *G05B 13/0265* (2013.01)
(58) Field of Classification Search
CPC .......................... G05B 13/021; G05B 13/0265
USPC ......................................................... 700/28
See application file for complete search history.

(56) References Cited

U.S. PATENT DOCUMENTS

| | | | | |
|---|---|---|---|---|
| 9,613,439 B1* | 4/2017 | Raj | ........................ | G06T 11/006 |
| 2003/0089293 A1* | 5/2003 | Vos | ......................... | B63B 1/244 |
| | | | | 114/284 |
| 2011/0218950 A1* | 9/2011 | Mirowski | .............. | G06N 3/084 |
| | | | | 706/58 |
| 2017/0017212 A1 | 1/2017 | Collins et al. | | |
| 2021/0003973 A1* | 1/2021 | Chakrabarty | ..... | G06F 18/24133 |

(Continued)

OTHER PUBLICATIONS

Sui et al., "Safe Exploration for Optimization With Gaussian Processes," Proceedings of the 32nd International Conference on Machine Learning, JMLR, vol. 37, 2015, pp. 1-9. <http://proceedings.mlr.press/v37/sui15.pdf> Downloaded Jun. 8, 2023.

(Continued)

*Primary Examiner* — Jigneshkumar C Patel
(74) *Attorney, Agent, or Firm* — NORTON ROSE FULBRIGHT US LLP

(57) ABSTRACT
A computer-implemented control method of constrained controlling of a computer-controlled system. The system is controlled according to a control input, which is safe if a constraint quantity resulting from the controlling of the computer-controlled system exceeds a constraint threshold. A current control input is determined based on previous control inputs and corresponding previous noisy measurements. The computer-controlled system is controlled according to the current control input, thereby obtaining a current noisy measurement of the resulting constraint quantity. The current control input is determined based on a mutual information between a first random variable representing the constraint quantity resulting from the current control input and a second random variable indicating whether a further control input is safe.

14 Claims, 6 Drawing Sheets

(56)     References Cited

U.S. PATENT DOCUMENTS

| 2021/0049501 A1 | 2/2021 | Kalabic et al. |
| 2021/0131260 A1* | 5/2021 | Zagayevskiy ......... E21B 47/003 |
| 2021/0359517 A1* | 11/2021 | Wu ......................... G06F 30/27 |

OTHER PUBLICATIONS

Turchetta et al., "Safe Exploration for Interactive Machine Learning," 33rd Conference on Neural Information Processing Systems (NEURIPS 2019), 2019, pp. 1-11. <https://dl.acm.org/doi/pdf/10.5555/3454287.3454547> Downloaded Jun. 8, 2023.

Chowdhury et al., "On Kernelized Multi-Armed Bandits," Proceedings of the 34th International Conference on Machine Learning, PMLR, vol. 70, 2017, pp. 1-10. <http://proceedings.mlr.press/v70/chowdhury17a/chowdhury17a.pdf> Downloaded Jun. 8, 2023.

Kingma et al., "ADAM: A Method for Stochastic Optimization," Cornell University, 2017, pp. 1-15.

Sui et al., "Stagewise Safe Bayesian Optimization With Gaussian Processes," Proceedings of the 35th International Conference on Machine Learning, PMLR, vol. 80, 2018, pp. 1-9. <https://core.ac.uk/download/pdf/216299189.pdf> Downloaded Jun. 8, 2023.

Brockman et al., "OpenAI Gym," Cornell University, 2016, pp. 1-4. <https://arxiv.org/abs/1606.01540> Downloaded Jun. 8, 2023.

Mowbray et al., "Safe Chance Constrained Reinforcement Learning for Batch Process Control," Computers & Chemical Engineering, vol. 157, No. 11, 2022, pp. 1-18.

* cited by examiner

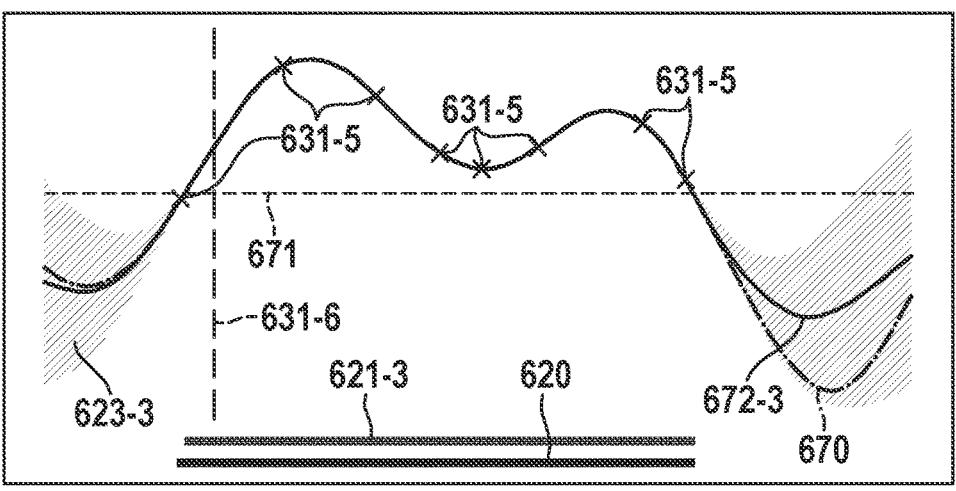
Fig. 6C
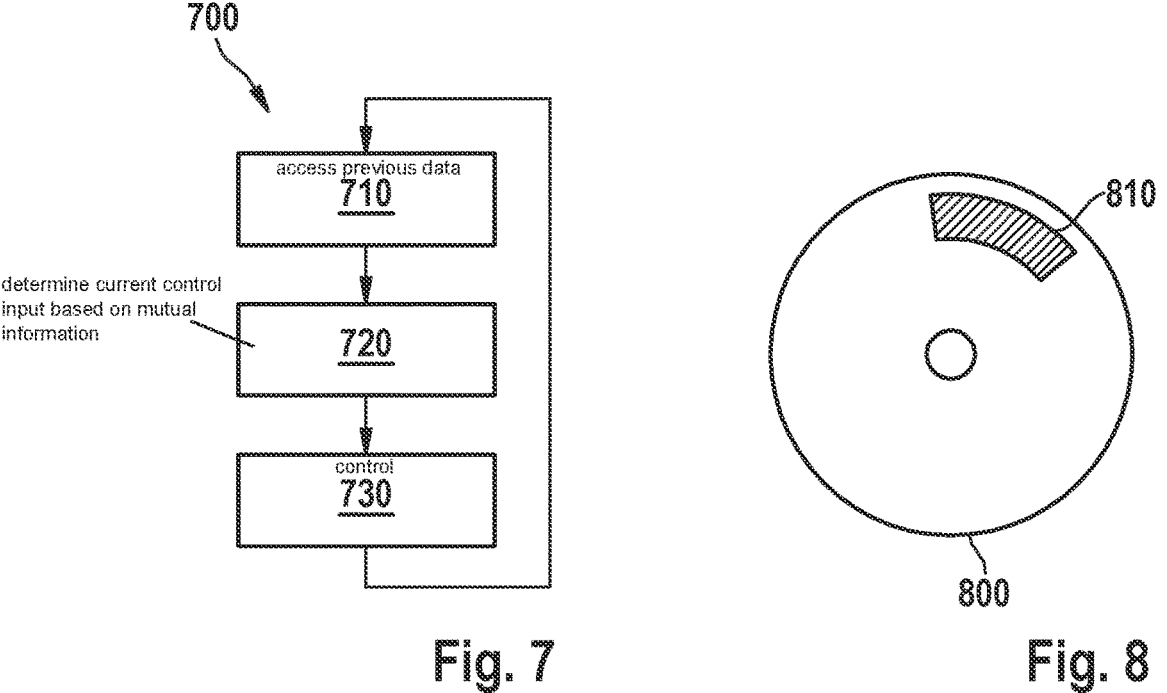
Fig. 7                    Fig. 8

CONSTRAINED CONTROLLING OF A COMPUTER-CONTROLLED SYSTEM

CROSS REFERENCE

The present application claims the benefit under 35 U.S.C. § 119 of European Patent Application No. EP 22 18 4158.8 filed on Jul. 11, 2022, which is expressly incorporated herein by reference in its entirety.

FIELD

The present invention relates to a computer-implemented method of constrained controlling of a computer-controlled system, and to a control system corresponding to the method. The present invention also relates to a system comprising the control system and the system it controls. The present invention further relates to a computer-readable medium.

BACKGROUND INFORMATION

In more and more technical fields, systems are being used that are controlled by a computer. For example, computer-controlled systems include robots and mechanical systems such as manufacturing systems. In recent years, such computer-controlled systems are increasingly being controlled using machine learnable models. Such models have the potential of providing better performance, and being better equipped to handle unexpected situations, than manually designed control techniques. In particular, a computer-controlled system may be trained according to a sequential decision-making process, which may comprise iteratively obtaining observation data representing the environment of the system and determining control data based on the observation data, thereby exploring the way in which the system interacts with the environment.

However, in practice, real-world environment interactions are typically subject to various constraints that should not be violated, neither in use nor during training. These can include safety constraints, e.g., ensuring that a robot does not crash into an object or person, but also performance constraints, e.g., ensuring that a manufacturing machine meets a minimum performance level while it is being fine-tuned by online training. Such a constraint may be phrased in terms of a constraint quantity, where the controlling is considered "safe" if the constraint quantity exceeds a constraint threshold.

Unfortunately, typically, it is a priori not known which control inputs lead to values of the constraint quantity that violate the constraint. Only by controlling the system, a noisy measurement of the safety quantity can be obtained. Accordingly, techniques are needed to control a computer-controlled system in order to learn information about the constraint quantity, without the constraint being violated; in other words, using only control inputs that are likely to result in a constraint quantity exceeding the constraint threshold. Put another way, there is a need to learn about the safety of parameters by only evaluating parameters that are currently known to be safe. Since controlling the computer-controlled system costs time and money, it is also important for such exploration to be performed in a data-efficient way, in other words, to learn as much information about the safety of control inputs using as little interaction with the environment as possible.

In Y. Sui et al., "Safe exploration for optimization with Gaussian processes", proceedings ICML 2015 (incorporated herein by reference), a method is described called SafeOpt. SafeOpt optimizes an unknown function from noisy samples while requiring that the sampled function meets a safety threshold. To learn about the safety of the unknown function, SafeOpt defines a subset of the safe set comprised of points that are likely to expand the safe set if evaluated, and chooses the next point to evaluate among the defined subset as the one with the highest variance. The subset is defined according to a Lipschitz continuity assumption that can be tuned by setting the Lipschitz constant. More generally, SafeOpt and similar approaches assume a discrete domain and promote safe exploration of this domain by explicitly exploiting local regularity assumptions by means of the Lipschitz constant hyperparameter.

SUMMARY

It would be desirable to provide techniques for controlling a computer-controlled system to learn about safety of control inputs, that have improved data efficiency. It would also be desirable for such techniques to be able operate more efficiently on continuous-valued control inputs, and to rely on fewer hyperparameters.

In accordance with a first aspect of the present invention, a computer-implemented control method and a corresponding control system are provided for constrained controlling of a computer-controlled system. In accordance with another aspect of the present invention, a system is provided comprising the control system and the computer-controlled system it is configured to control. In accordance with an aspect of the present invention, a computer-readable medium is provided.

Various measures discussed herein relate to the controlling of a computer-controlled system. The computer-controlled system may be controlled according to a control input, e.g., a vector of one or more continuous values. The control input can for example represent control data to be provided directly to an actuator, or can represent parameters for deriving respective control data to be provided to an actuator in respective iterations.

The controlling may be considered "safe" if a certain constraint quantity, resulting from the controlling of the computer-controlled system according to a control input, exceeds a constraint threshold. The constraint quantity may be a safety constraint, e.g., a constraint indicative of physical damage to the computer-controlled system itself or its environment due to the controlling. The constraint can also more generally indicate a desired minimum performance or another output-related function, for example, the constraint can represent a minimum quality of products output by a computer-controlled manufacturing machine. With such a type of constraint, safety exploration can be performed while ensuring that the controlling itself is useful, e.g., to perform online safe optimization; and/or while ensuring that a part of the state space is explored that is relevant to later real use.

The constraint quantity may be unknown a priori. In particular, an exact functional description of the constraint quantity given the control input may be unknown to the system that determines the control inputs. Instead, safety of control inputs may be explored by iteratively determining a current control input and controlling the computer-controlled system according to the current control input, resulting in a current noisy measurement of the resulting constraint quantity. Here, the noise can be due to measurement error and/or stochasticity of the computer-controlled system and/or the environment in which it operates.

Because of the lack of an exact functional description, the system that determines the control inputs, may not be able to guarantee with absolute certainty that a given control input is safe. However, based on previous control inputs and corresponding previous noisy measurements of the resulting constraint quantity, it may be possible to establish that a control input is safe with sufficient probability, e.g., exceeding a given threshold, for example according to a statistical model. The controlling of the computer-controlled system may be "constrained" in the sense that it is based on the expected safety of control inputs, and in particular, in the sense that control inputs are determined and used to control the computer-controlled system that are determined likely to be safe.

Interestingly, the inventors envisaged to determine the control input based on the information that it provides about other control inputs. In particular, the current control input may be determined based on a mutual information between two random variables. The first random variable may represent the constraint quantity resulting from the current control input. The second random variable may relate to a further control input, that is typically different from the control input itself. The second random variable may indicate whether this further control input is safe. Accordingly, the current control input may be determined such that it directly indicates an amount of information that is expected to be gained about the safety of other control inputs.

In other words, an improved safe exploration acquisition function is provided that, based on the mutual information, determines a more informative safe control inputs. The mutual information may provide a measure of information gain about the safety of regions which, according to the current posterior, are neither likely safe nor unsafe. In particular, the current control input x may be selected from a safe set for which another point z, not necessarily in the safe set, exists such that the information gain about the safety at z by measuring at x is maximal, thereby effectively exploiting correlations between different regions of the domain.

This is unlike approaches that use uncertainty about the current control input itself, which is only a proxy objective for the information about safety of parameters that safe exploration is intended to learn. More directly selecting the current control input based on the information that the safe exploration is intended to learn, may improve the data-efficiency of the safe exploration. The use of such mutual information-based control inputs is also referred to herein as Information-Theoretic Safe Exploration (ISE).

As mentioned, the further control input is typically different from the current control input, and in particular, the further control input can lie outside of a safe set of control inputs considered likely to be safe based on previous control inputs and corresponding noisy measurements. However, this is not needed, as will be discussed in more detail below. It is also noted that, apart from the mutual information, also other factors may be taken into account when determining the current control input, e.g., the current control input may be further based on a Bayesian optimization objective, as also discussed elsewhere.

By using the mutual information, a safe exploration technique is provided that directly exploits information gain about the safety of control inputs in order to expand the region of the parameter space that is known to be safe. By directly optimizing for safe information gain, data efficiency is improved, while also remedying various other disadvantages of existing techniques. There is no need to manually restrict the selection of control inputs to be on the boundary of the safe set, which is a heuristic that may miss control inputs from which more information can be learned. There is also a reduced need for hyperparameters, and in particular, there is no need for a hyperparameter representing the Lipschitz constant L corresponding to a L-Lipschitz continuity assumption that introduces an undesired trade-off between safety and performance.

Moreover, the determination of the current control input and/or the selection of the further control input can be performed efficiently and accurately for continuous-valued control inputs without the need for discretization. The provided techniques also scale well to higher-dimensional control inputs, e.g., with control inputs with dimension at least 5 or at least 10. Finally, it can be guaranteed mathematically that the provided techniques learn about the safety of reachable control inputs to arbitrary precision.

According to an example embodiment of the present invention, optionally, the mutual information may be defined according to a Gaussian Process model of the constraint quantity given the control input. This model may comprise modelling the noisy measurement of the constraint quantity as a noisy evaluation of an unknown function, and relating the current control input to previous control inputs according to a kernel function. Such a model may provide a suitable stochastic model of the expected value of the constraint quantity for the control input, based on which the mutual information may be defined.

According to an example embodiment of the present invention, optionally, the current control input and the further control input may be determined to maximize the mutual information. In other words, an optimization may be performed in which the current control input and at least one further control input are parameters. For example, a current control input may be selected that maximizes the maximum mutual information over one or more further control inputs. In the optimization, the current control input may be constrained to lie in a safe set of control inputs determined likely to be safe. By optimizing both for the current control input and the further control input(s), a current control input may be determined that is most informative about points other than the current control input itself.

The optimization typically results in a further control point that is different from the current control input and/or lies outside of a safe set of control inputs determined likely to be safe; but the optimization is typically not constrained to such further control points. As a consequence, it may not be excluded per se that the optimization returns e.g. a further control point within the safe set. However, typically, at least at some stage during the iterative controlling, a further control point outside of the safe set at that point is selected.

According to an example embodiment of the present invention, the optimization may be performed with respect to a single further control point, or in any case, a limited number of further control points, e.g., at most two or at most five. This is beneficial because it allows the current control point to be determined in a computationally efficient way (e.g., avoiding Monte Carlo averaging, and the like), and because it results in control procedure for which strong mathematical guarantees about exploration performance can be provided.

Optionally, the mutual information between the random variables may be maximized by a multi-start gradient descent. (Here, the term "gradient descent" includes both optimization by minimization and by maximization, the latter also sometimes being referred to as gradient ascent.) This is a good way to deal with the non-convexity of the optimization problem of maximizing the mutual information, in particular when restricting the current control input to lie in a safe set. However, other optimization techniques are also possible in principle.

According to an example embodiment of the present invention, optionally, the mutual information may be averaged over multiple further control inputs. In particular, the mutual information may be averaged over a continuous domain, in particular, over the set of possible control inputs. This allows to take into account the overall information gain of using the current control input, as opposed to the information gain for one or few further control inputs. For example, Monte Carlo averaging or other approximations may be used to deal with a continuous domain. Although this incurs additional computation complexity, the resulting control input can be more informative, which can be worthwhile especially if controlling the computer-controlled system is especially costly or time-consuming.

Optionally, according to an example embodiment of the present invention, the constraint quantity may represent a safety constraint, e.g., the constraint quantity may indicate a physical damage to the computer-controlled system and/or its environment. Instead of or in addition of indicating safety, the constraint quantity may indicate a minimal performance level, e.g., for use online optimization.

Optionally, according to an example embodiment of the present invention, the current control input may be determined such that the current control input lies in a safe set of control inputs determined likely to be safe. E.g., according to a statistical model of the constraint quantity, the control input may lead to a value of the constraint quantity that exceeds a constraint threshold with a given probability (which can be constant, but can also vary in time). The probability is application-dependent but can for example be at least 95%, at least 99%, or at least 99, 9%. The safe set may be defined based on the previous control inputs and corresponding previous noisy measurements, e.g., based on a Gaussian Process model of the constraint quantity.

Optionally, according to an example embodiment of the present invention, the further control input may not lie in the safe set. As also discussed elsewhere, the current control input and the further control input are typically not determined in such a way that the further control input is guaranteed not to lie in the safe set. However, because further control inputs outside of the safe set typically have a higher uncertainty about their safety, typically, at some point, or even in a majority of cases during the optimization, further control inputs may be used that are outside of the safe set. In any case, it is noted that the safe set typically evolves due to additional measurements of the constraint quantity being made. For example, the further control input may lie outside of the safe set when the current control input is determined, but may later, e.g., as a consequence of the controlling according to the current control input, come to lie in a later safe set.

Optionally, according to an example embodiment of the present invention, the mutual information between the first and second random variables may be determined by approximating an entropy of the further control input being safe by a first-order Taylor expansion of a Gaussian distribution. The second random variable may be based on an indicator function indicating whether or not the further control input is safe. The mutual information may be determined based on an entropy of this indicator function. Averaging this entropy over possible measurements of the constraint quantity for the control input may in general lead to an intractable integral for the mutual information. Interestingly, the inventors found that, by using a Taylor expansion for the entropy, an accurate closed-form approximation for the mutual information can be derived, allowing the mutual information to be efficiently and accurately be computed, especially when optimizing the current control input. Thereby a more accurate current control input can be determined.

Optionally, according to an example embodiment of the present invention, the control input may comprise one or more continuous-valued control parameters. Interestingly, where some existing approaches rely on discretization, the provided techniques work well with continuous-valued control parameters. In particular, efficient optimization techniques for continuous functions such as gradient descent can be used. The use of continuous-valued control parameters, in particular without a discretization, is particularly beneficial for higher-valued control inputs, e.g., comprising at least two, at least three, at least five, or at least ten continuous values. In particularly, the provided techniques can operate on any control signal expressible in terms of real scalar signals in a d-dimensional domain.

Optionally, according to an example embodiment of the present invention, the provided techniques for constrained controlling may be combined with the training of a control model for controlling the computer-controlled system. Such training may be performed by Bayesian optimization. Generally, in Bayesian optimization, an objective black box function may be optimized via sequential evaluations at points, in the present context: control inputs which do not violate an a priori unknown safety constraint. The Bayesian optimization may be performed simultaneously to the provided safe controlling, by determining a control input both based on the mutual information and based on the Bayesian optimization. It is also possible to perform the Bayesian optimization subsequently to the proposed constrained controlling in a multi-stage training, where, also during the Bayesian optimization, the safe set determined by the controlling may be taken into account and/or extended with additional measurements.

Generally, various types of Bayesian optimization can be used. The Bayesian optimization can be used to perform reinforcement learning, in other words policy search, wherein parameters are being learned that parameterize a policy for controlling the computer-controlled system. The Bayesian optimization can be based on an upper confidence bound acquisition function; for example, the current control input can be determined both based on the mutual information and on the acquisition function.

Optionally, according to an example embodiment of the present invention, the control model may be trained based on a model of the computer-controlled system as a Markov Decision Process (MDP). In particular, it is conventional to learn about safety of parameters of a MDP using techniques similar to SafeOpt, as discussed e.g. in M. Turchetta et al., "Safe exploration for interactive machine learning", proceedings NeurIPS 2019 (incorporated herein by reference). Also in this Markov Decision Process context, constrained controlling by determining a current control input based on a mutual information as proposed herein, can be applied.

Generally, the proposed techniques according to the present invention can be used for a wide variety of computer-controlled systems. For example, the computer-controlled system can be a medical device. In this case, the constraint quantity may indicate an amount of pain and/or harm caused to a patient, for example. The computer-controlled system can also be a robotic system, a vehicle, a domestic appliance, a power tool, a manufacturing machine, a personal assistant or an access control system, for example.

As a concrete example, the computer-controlled system can be a drone. The drone may be controlled e.g. by linear control or by reinforcement learning. The constraint quantity may be based on distance to a target that is to be reached, and/or based on a safety constraint, e.g., a maximal speed or a minimal distance to other objects of the drone.

As another example, the computer-controlled system can be an industrial system such as a manufacturing machine. The industrial system may be optimized in terms of a performance measure, e.g., an efficiency. The optimization may be online optimization wherein the constraint quantity guarantees a minimal performance and/or safety.

As another example, the provided techniques can be used for hyperparameter optimization of a machine learnable model. The control inputs may represent hyperparameters of the machine learnable model. Controlling the system may comprise training the machine learnable model according to the hyperparameters, where the constraint quantity represents a measurement due to a controlling of the computer-controlled system as part of the training. Also in this case, the constraint quantity may for example indicate a minimal performance and/or a safety constraint.

It will be appreciated by those skilled in the art that two or more of the above-mentioned embodiments, implementations, and/or optional aspects of the present invention may be combined in any way deemed useful.

Modifications and variations of any system and/or any computer readable medium, which correspond to the described modifications and variations of a corresponding computer-implemented method, can be carried out by a person skilled in the art on the basis of the present description.

BRIEF DESCRIPTION OF THE DRAWINGS

These and other aspects of the present invention will be apparent from and elucidated further with reference to the embodiments described by way of example in the following description and with reference to the figures.

BRIEF DESCRIPTION OF THE DRAWINGS

Figure 1:
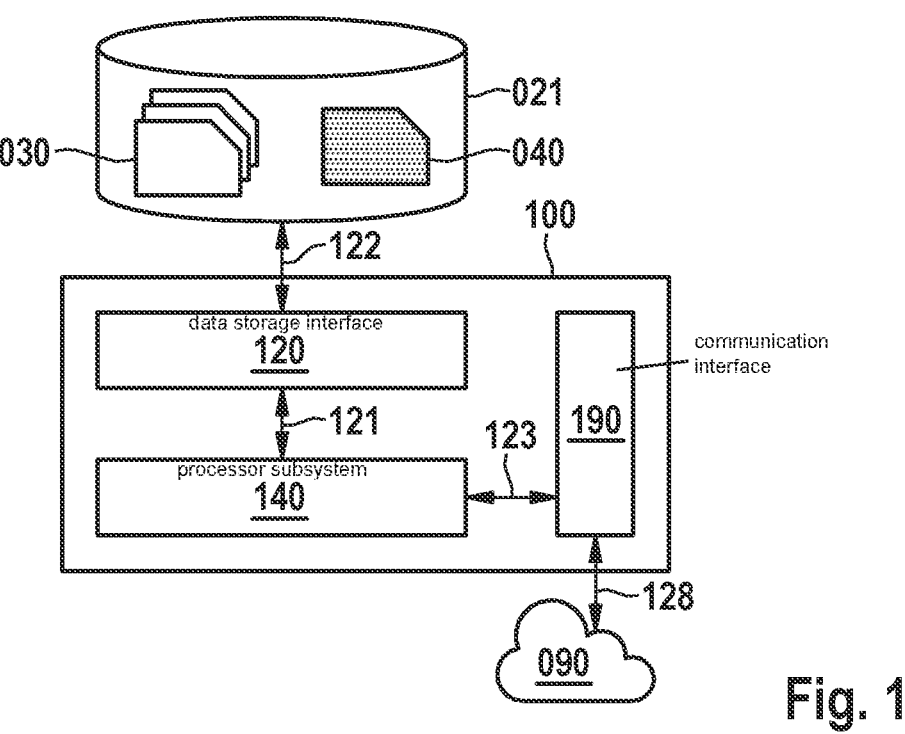

FIG. 1 shows a control system for constrained controlling, according to an example embodiment of the present invention.

Figure 2:
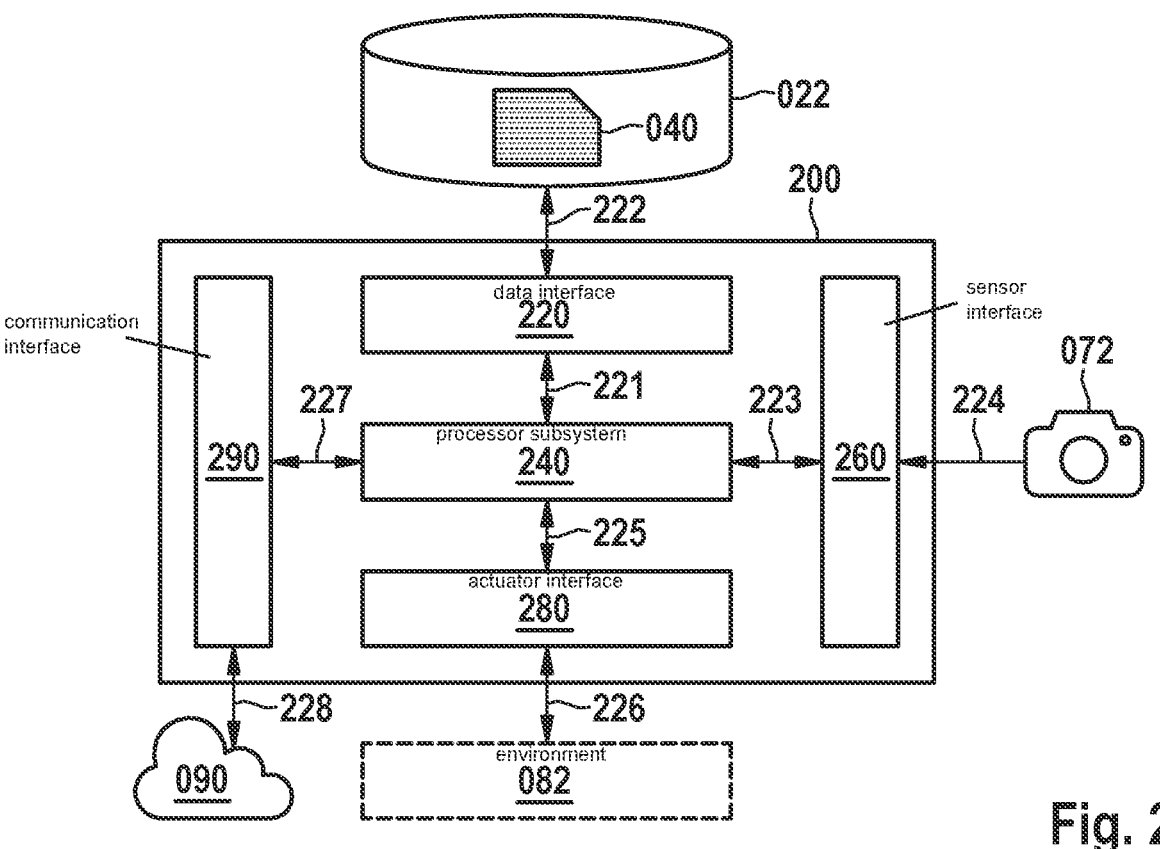

FIG. 2 shows a computer-controlled system, according to an example embodiment of the present invention.

Figure 3:
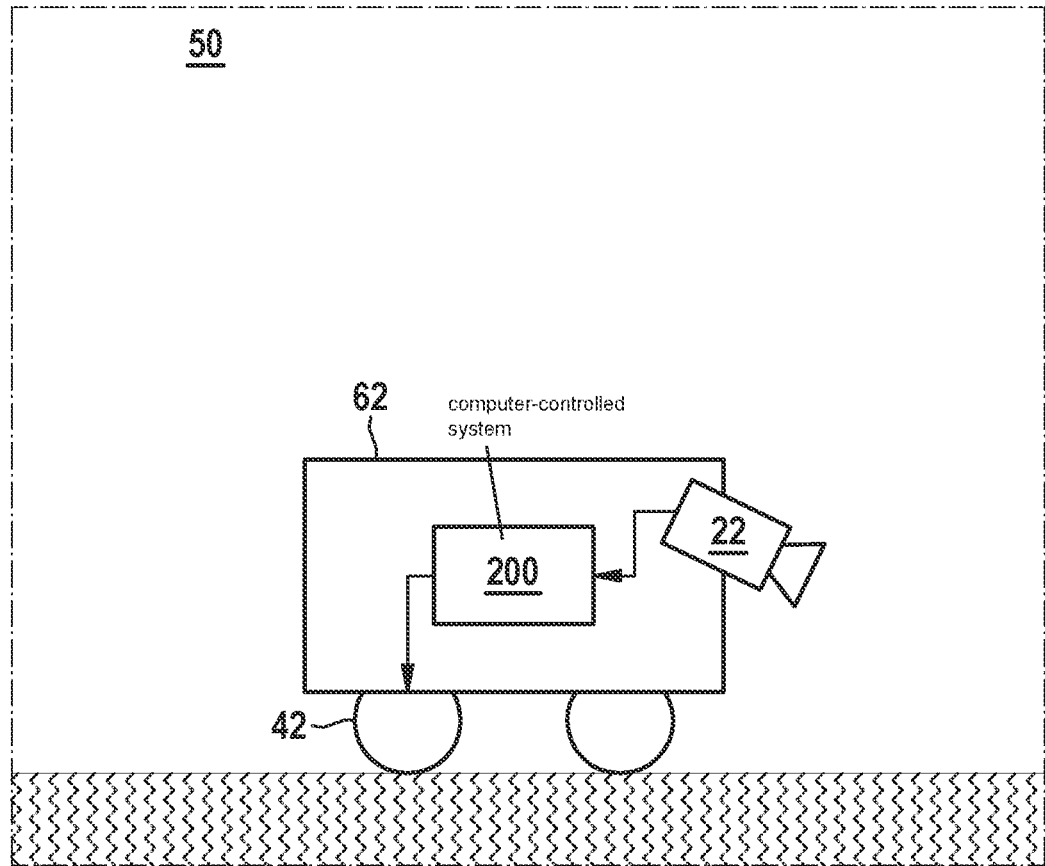

FIG. 3 shows a (semi-) autonomous vehicle controlled by a computer, according to an example embodiment of the present invention.

Figure 4:
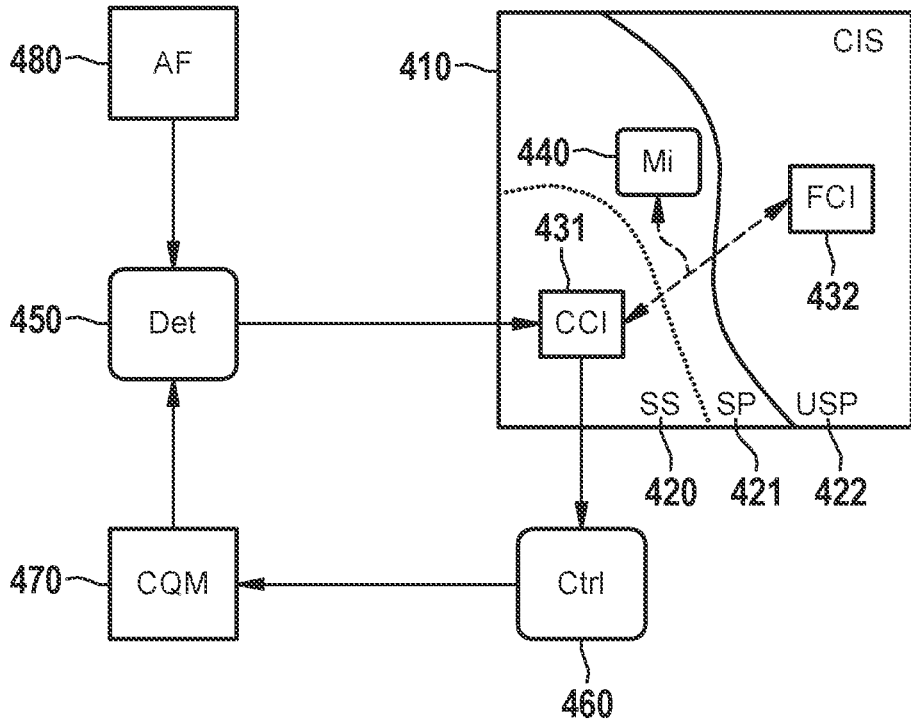

FIG. 4 shows a detailed example of how to control a computer-controlled system in a constrained way, according to an example embodiment of the present invention.

Figure 5A:
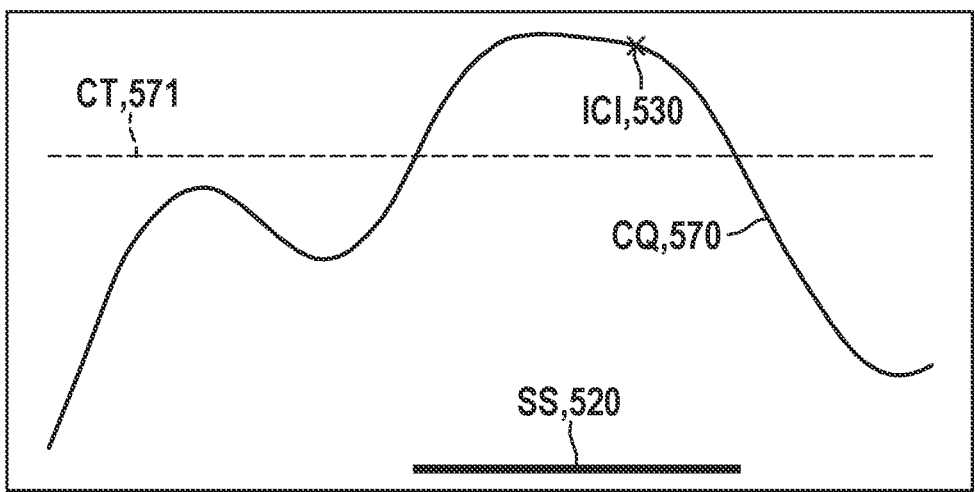
Figure 5B:
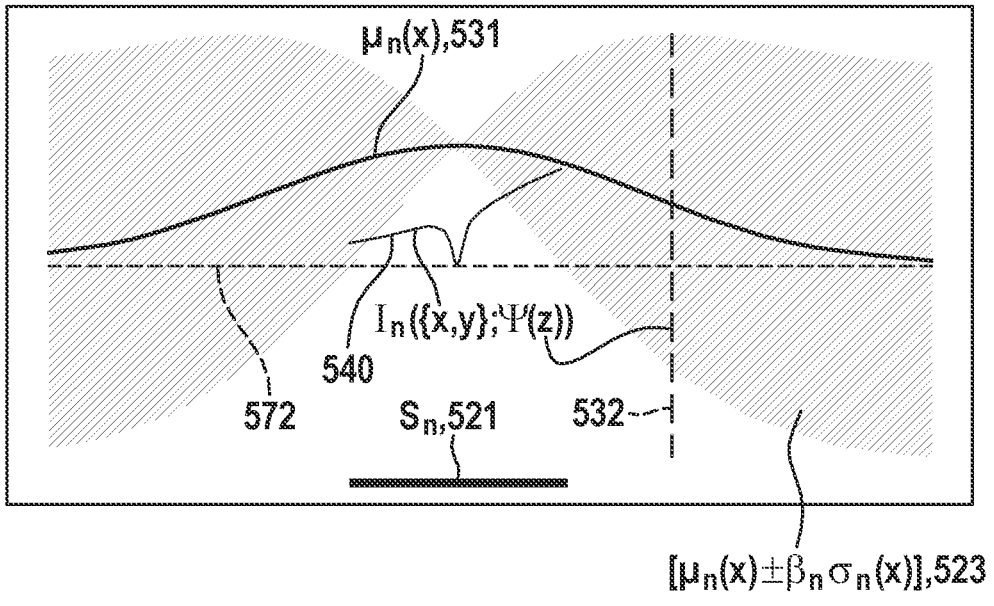

FIGS. 5A-5B illustrate control inputs of a computer-controlled system, according to an example embodiment of the present invention.

Figure 6A:
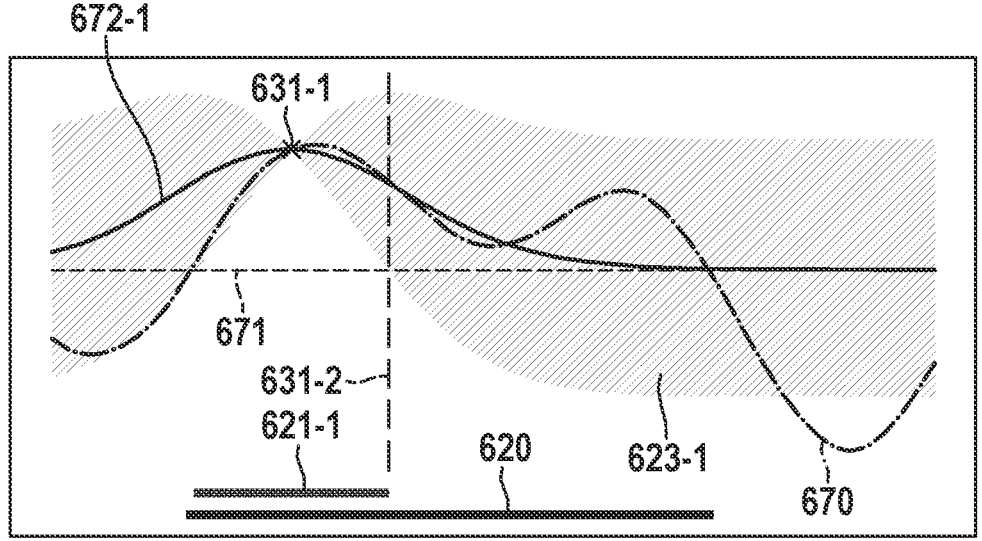
Figure 6B:
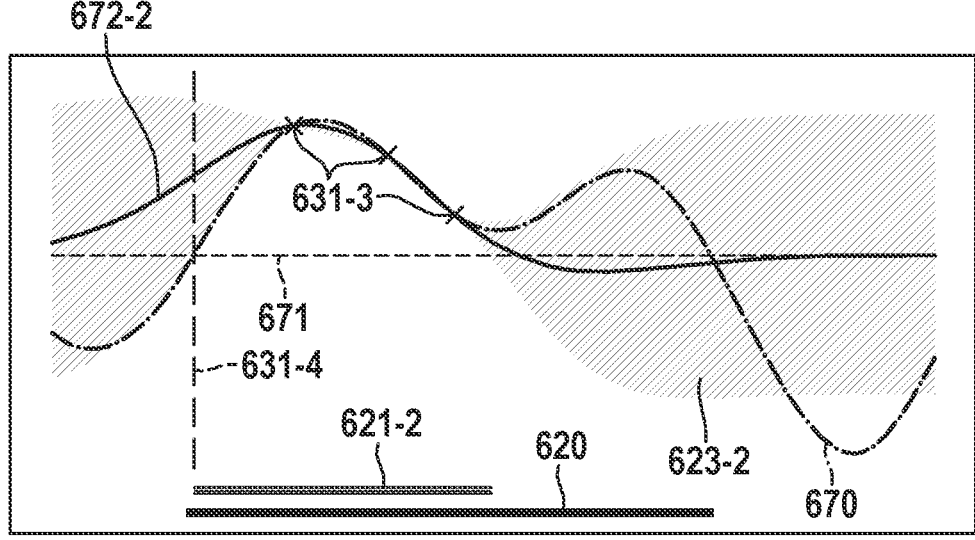

FIGS. 6A-6C illustrate control inputs of a computer-controlled system, according to an example embodiment of the present invention.

FIG. 7 shows a computer-implemented control method, according to an example embodiment of the present invention.

FIG. 8 shows a computer-readable medium comprising data, according to an example embodiment of the present invention.

It should be noted that the figures are purely diagrammatic and not drawn to scale. In the figures, elements which correspond to elements already described may have the same reference numerals.

DETAILED DESCRIPTION OF EXAMPLE EMBODIMENTS

FIG. 1 shows a control system 100 for constrained controlling of a computer-controlled system, e.g., computer-controlled system 200 of FIG. 2. The computer-controlled system may be controlled according to a control input 128. The control input may be safe if a constraint quantity resulting from the controlling of the computer-controlled system exceeds a constraint threshold.

The system 100 may comprise a data interface for accessing data 030 representing previous control inputs and corresponding previous noisy measurements of the resulting constraint quantity. Optionally, the data interface may be for accessing a control model 040 being trained by system 100. The control inputs and measurements 030, data representing a safe set of control inputs for the computer-controlled system that is based on the control inputs and measurements 030, and/or the control model 040 may be used to control the computer-controlled system, for example by control system 100 or computer-controlled system 200 itself. Control system 100 may be combined in a single system with the computer-controlled system, e.g., system 200 of FIG. 2.

For example, as also illustrated in FIG. 1, the data interface may be constituted by a data storage interface 120 which may access the data 030, 040 from a data storage 021. For example, the data storage interface 120 may be a memory interface or a persistent storage interface, e.g., a hard disk or an SSD interface, but also a personal, local or wide area network interface such as a Bluetooth, Zigbee or Wi-Fi interface or an ethernet or fibreoptic interface. The data storage 021 may be an internal data storage of the system 100, such as a hard drive or SSD, but also an external data storage, e.g., a network-accessible data storage. In some embodiments, the data 030, 040 may each be accessed from a different data storage, e.g., via a different subsystem of the data storage interface 120. Each subsystem may be of a type as is described above for data storage interface 120.

The system 100 may further comprise a processor subsystem 140 which may be configured to, during operation of the system 100, determine a current control input 128 based on the previous control inputs and the corresponding previous noisy measurements 030. The current control input may be determined using a signal based on a mutual information between a first random variable representing the constraint quantity resulting from the current control input and a second random variable indicating whether a further control input is safe. The current control input may be based on further signals, e.g., a signal for training a control model and/or for online optimization of the computer-controlled system.

The processor subsystem 140 may be further configured to control the computer-controlled system according to the current control input, thereby obtaining a current noisy measurement of the resulting constraint quantity.

Generally, the controlling of the computer-controlled system may be performed in various ways. In particular, the system 100 may comprise a communication interface 190 configured for communication 128 with the computer-controlled system. Control system 100 may provide the current control input to the computer-controlled system via the communication interface. Alternatively, control system 100 may derive one or more respective control signals based on the current control input, e.g., based further on respective sensor measurements of the computer-controlled system, and communicate the control signals, and optionally also the sensor measurements, via interface 190. Control system 100 may obtain the current noisy measurement of the constraint quantity via communication interface 190, e.g., from the computer-controlled system, but system 100 can also perform the measurement itself, e.g., via a sensor interface as discussed with respect to FIG. 2. As discussed above, system 100 can also be combined with system 200. Accordingly, in general, system 100 may comprise an output interface for outputting the current control input, and/or control signals derived from the current control input, which can for example be communication interface 190 or an actuator interface as in FIG. 2.

Communication interface 190 may internally communicate with processor subsystem 140 via data communication 123. Communication interface 190 may be arranged for direct communication with the computer-controlled system, e.g., using USB, IEEE 1394, or similar interfaces. As illustrated, communication interface 190 may communicate over a computer network, for example, a wireless personal area network, an internet, an intranet, a LAN, a WLAN, etc. For instance, communication interface 190 may comprise a connector, e.g., a wireless connector, an Ethernet connector, a Wi-Fi, 4G or 4G antenna, a ZigBee chip, etc., as appropriate for the computer network. Communication interface 190 may also be an internal communication interface, e.g., a bus, an API, a storage interface, etc.

The system 100 may further comprise an output interface (not shown) for outputting output data based on the collected control inputs and noisy measurements 030, and/or for outputting the trained control model 040. For example, the collected inputs and measurements itself may be output, or data representing a safe set derived from the inputs and measurements. For example, the output interface may be constituted by the data interface 120, with said interface being in these embodiments an input/output ('IO') interface, via which the output data may be stored in the data storage 021. In some embodiments, the output interface may be separate from the data storage interface 120, but may in general be of a type as described above for the data storage interface 120. As another example, the output interface may be constituted by the communication interface 190, e.g., with the output data being output to the computer-controlled system that is being controlled, or to another system.

FIG. 2 shows a computer-controlled system 200. The computer-controlled system 200 may be controlled according to a control input by a control system, e.g., control system 100 of FIG. 1. The controlling according to the control input may result in a noisy measurement 224 of a constraint quantity. The noise may generally arise from the computer-controlled system 200, the environment 082 that the system 200 interacts with, and/or the measurement of the constraint quantity. Apart from the noise, the constraint quantity may depend deterministically on the control input, e.g., the noisy measurement may be represented as an output of a function applied to the control input, to which a noise is added that is independent from the control input.

The system 200 may comprise a data interface 220. The data interface may be for accessing model data representing a control model trained as described herein, e.g., by system 100 of FIG. 1. The data interface may instead or in addition be for storing control inputs, noisy measurements of the constraint quantity, or other data related to the controlling of system 200. For example, as also illustrated in FIG. 2, the data interface may be constituted by a data storage interface 220 which may access the data 040 from a data storage 022. In general, the data interface 220 and the data storage 022 may be of a same type as described with reference to FIG. 1 for data interface 120 and the data storage 021.

The system 200 may comprise a sensor interface 260 for accessing sensor data 224 indicative of a measurement of the constraint quantity, acquired by a sensor 072 in the environment 082. The sensor may be arranged in environment 082 but may also be arranged remotely from the environment 082, for example if the quantity(s) can be measured remotely. The sensor 072 may but does not need to be part of the system 200. The sensor 072 may have any suitable form, such as an image sensor, a lidar sensor, a radar sensor, a pressure sensor, a contain temperature sensor, etc. In some embodiments, the sensor data 072 may sensor measurements of different physical quantities in that it may be obtained from two or more different sensors sensing different physical quantities. The sensor data interface 260 may have any suitable form corresponding in type to the type of sensor, including but not limited to a low-level communication interface, e.g., based on I2C or SPI data communication, or a data storage interface of a type as described above for the data interface 220.

The system 200 may further comprise an actuator interface 280 for providing control data 226 to an actuator (not shown) in the environment 082. The actuator may be part of system 200. For example, the actuator may be an electric, hydraulic, pneumatic, thermal, magnetic and/or mechanical actuator. Specific yet non-limiting examples include electrical motors, electroactive polymers, hydraulic cylinders, piezoelectric actuators, pneumatic actuators, servomechanisms, solenoids, stepper motors, etc. Such type of control is described with reference to FIG. 3 for an (semi-) autonomous vehicle.

The system 200 may also comprise a communication interface 290 configured for communication 228 with the control system that controls it, e.g., system 100 of FIG. 1. Communication interface 290 may internally communicate with processor subsystem 240 via data communication 227. Communication interface 290 may be as described for communication interface 190 of FIG. 1. In particular, as illustrated, communication interface 290 may be for communication 228 over a computer network 090; or communication interface 290 can be an internal communication interface.

Processor subsystem 240 may be configured to let the computer-controlled system 200 operate according to the control input of the control system 100 in various ways.

In some embodiments, processor subsystem 240 may be configured to receive the control input from the control system via the communication interface, and may provide control data 226 corresponding to or based on the control input to the actuator(s) via the actuator interface. For example, the control data may comprise values of one or more physical quantities according to which the actuator acts. In other embodiments, processor subsystem 240 may be configured to receive one or more control instructions determined by the control system based on the control input, and provides control data 226 corresponding to or based on the control instructions to the actuator(s). In a further stage following the constrained controlling by the control system, processor subsystem 240 may operate autonomously, e.g., according to trained control model 040 or based on control inputs and noisy measurements, or a safe set, resulting from the constrained controlling.

In some embodiments, processor subsystem 240 may be configured to obtain, via the sensor interface 260, measurements 224 of the constraint quantity resulting from the controlling of the computer-controlled system, and to provide the measurements, via the communication interface 290, to the control system.

It will be appreciated that the same considerations and implementation options apply for the processor subsystem 240 as for the processor subsystem 140 of FIG. 1. It will be further appreciated that the same considerations and implementation options may in general apply to the system 200 as for the system 100 of FIG. 1, unless otherwise noted.

In general, each system described in this specification, including but not limited to the system 100 of FIG. 1 and the system 200 of FIG. 2, may be embodied as, or in, a single device or apparatus, such as a workstation or a server. The device may be an embedded device. The device or apparatus may comprise one or more microprocessors which execute appropriate software. For example, the processor subsystem of the respective system may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the processor subsystem of the respective system may be implemented in the device or apparatus in the form of programmable logic, e.g., as a Field-Programmable Gate Array (FPGA). In general, each functional unit of the respective system may be implemented in the form of a circuit. The respective system may also be implemented in a distributed manner, e.g., involving different devices or apparatuses, such as distributed local or cloud-based servers. In some embodiments, the system 200 may be part of a vehicle, robot or other physical entity. System 100 and system 200 may be combined into a single system, e.g., a single device.

FIG. 3 shows an example of the above, in that a (semi-) autonomous vehicle is being shown that is being controlled by a computer. The (semi-)autonomous vehicle 62 may operate in an environment 50. The autonomous vehicle 62 may be autonomous in that it may comprise an autonomous driving system or a driving assistant system, with the latter also being referred to as a semiautonomous system.

In this example, as illustrated, system 200 of FIG. 2 may be incorporated in the autonomous vehicle. System 100 may be incorporated in the vehicle as well, or can be used to control the vehicle remotely. For example, systems 100 and 200 may be used to train the vehicle to operate autonomously in the environment 50, e.g., to control the steering and braking of the autonomous vehicle in order to reach a target destination, based on sensor data obtained from a video camera 22 integrated into the vehicle 62.

For example, the controlling of the vehicle may be performed in a constrained way in that the controlling may be constrained such that the vehicle maintains a minimal distance to one or more objects in the environment 50, and/or that the vehicle adheres to a maximum speed, and/or that the vehicle attains a minimal performance level, e.g., a maximum time to reach a destination. Such constraints may be represented by a constraint quantity being required to exceed a constraint threshold. By controlling the vehicle in a constrained way based on the constraint quantity as described herein, it may be determined which control inputs are safe for controlling the vehicle, and optionally, a control model may be trained or fine-tuned in a safe way, e.g., by avoiding collisions, keeping to the maximum speed, or attaining a minimal performance level for online optimization.

FIG. 4 shows a detailed, yet non-limiting, example of how to control a computer-controlled system in a constrained way.

Shown in the figure is a space CIS, 410, of control inputs for controlling a computer-controlled system. The computer-controlled system may be controlled according to a current control input CCI, 431. The set of current control inputs may be denoted herein as $\chi$. The set $\chi$ may be a set of continuous-valued control parameters, e.g., $\mathbb{R}^n$ for a dimension n (e.g., n may be at most or at least three, at most or at least five, or at most or at least ten); or a continuous subset of such $\mathbb{R}^n$.

The provided techniques may be for constrained controlling of the computer-controlled system, in particular, for online safe optimization of a machine or controller. Constrained controlling may refer to the controlling Ctrl, 460, of the computer-controlled system according to the current control input CCI resulting in a value of a certain constraint quantity. The constraint quantity can for example represent a safety constraint, and is generally unknown, e.g., in functional form, to the control system, and expensive to evaluate. The controlling according to the current control input CCI may be considered safe if the resulting constraint quantity exceeds a certain constraint threshold. The control system may not know the constraint quantity as a function, but may, as a result of the controlling Ctrl, obtain a current noisy measurement COM, 470, of the constraint quantity. The constraint quantity may be user-defined or determined based on simulations, for example.

Mathematically, the constraint quantity may be modelled by a function $f:\chi \to \mathbb{R}$ with parameters x representing the current control input. Parameters x with $f(x) \geq 0$ may be classified as safe, while others are unsafe. Other constraint thresholds than zero can be supported by applying a suitable translation to the function. To start exploring safely, at least one initial safe parameter $x_0$ may be used that satisfies the safety constraint, $f(x_0) \geq 0$. This is illustrated by the curved line in the figure dividing the safe parameters SP, 421 left of the curved line, from the unsafe parameters USP, 422, right of the curved line.

The constrained controlling may comprise sequentially selecting parameters $x_n \in \chi$ where to evaluate $f$ in order to learn about the safety of parameters beyond $x_0$. At respective iterations n, respective noisy observations COM of the constraint quantity may be obtained, which may be modelled as function outputs $\gamma_n := f(x_n) + v_n$ corrupted by additive homoscedastic Gaussian noise $$v_n \sim \mathcal{N}(0, \sigma_v^2).$$

FIG. 5a further illustrates this. FIG. 5a shows an unknown safety constraint CQ, 570. The constrained controlling may aim to ensure that only safe parameters x with values $f(x) \geq 0$ above a constraint threshold CT, 571, are evaluated. Starting from a safe initial control input ICI, 530, a safe exploration strategy may aim to determine a safe set SS, 520, corresponding to the largest reachable safe region of the parameter space containing the point ICI.

Returning to FIG. 4. As the function describing the constraint quantity $f$ may be unknown, and the measurements $\gamma_n$ may be noisy, it may generally not be feasible to select parameters CCI that are safe with absolute certainty. Instead, high-probability safety guarantees may be provided.

Namely, the current control input CCI may be determined in such a way that the current control input lies in a safe set SS, 420, of control inputs determined likely to be safe. As illustrated in the figure, in which the safe set is to the left of the dotted curve, the safe set Ss may be a subset of the safe parameters SP. However, since the control inputs of the safe set are only likely to be safe, it is in principle possible for the safe set to contain unsafe points. Generally, the threshold at which a control input is determined sufficiently likely to be safe is dependent on the application domain. Setting a conservative (e.g., high) threshold may reduce the risk of using unsafe control inputs to control the system, but may also result in less optimal, e.g., slower, exploration.

The safe set SS may be defined based on previous control inputs and corresponding previous noisy measurements. For example, at least 5 or at least 10 previous control inputs and corresponding noisy measurements may be used. In particular, the safe set SS may be defined based on a Gaussian Process model of the measurement of the constraint quantity COM given the control input. In particular, the safety constraint may be modelled as a function $f$ which has bounded norm in a Reproducing Kernel Hilbert Space (RKHS) $\mathcal{H}_k$ associated to a kernel $k{:}\chi{\times}\chi{\rightarrow}\mathbb{R}$ with $k(x, x')\leq 1$.

As is conventional, a Gaussian Process may be defined as a stochastic process specified by a mean function $\mu\colon \chi{\rightarrow}\mathbb{R}$ and a kernel $k$. A Gaussian Process may define a probability distribution over real-valued functions on $\mathcal{X}$, such that a finite collection of function values at parameters $[x_1, \ldots, x_n]$ is distributed as a multivariate normal distribution. The GP prior can be conditioned on noisy function evaluations $$\mathcal{D}_n = \{(x_i, y_i)\}_{i=1}^n.$$

Modelling the noise as Gaussian, the resulting posterior may be a GP with posterior mean and variance:

$$\mu_n(x) = \mu(x) + k(x)^\top\left(K + I\sigma_v^2\right)^{-1}(y - \mu), \quad (1)$$

$$\sigma_n^2(x) = k(x, x) - k(x)^\top\left(K + I\sigma_v^2\right)^{-1}k(x),$$

where $\mu{:=}[\mu(x_1), \ldots \mu(x_n)]$ is the mean vector at parameters $x_i \in \mathcal{X}_n$ and $[y]_i{:=}\gamma(x_i)$ the corresponding vector of observations. Here, $[k(x)]_i{:=}k(x, x_i)$; the kernel matrix has entries $[K]_{ij}{:=}k(x_i, x_j)$; and I is the identity matrix.

Based on the Gaussian Process model, safe set SS may be defined as follows. Given a maximum error probability $\delta{>}0$, a sequence of positive numbers $\{\beta_n\}$ may be determined such that $f(x)\in [\mu_n(x){\pm}\beta_n\sigma_n(x)]$ with probability at least $1{-}\delta$, jointly for all $x\in \chi$ and $n{\geq}1$, e.g., see S. R. Chowdhury et al., "On kernelized multi-armed bandits", proceedings ICML 2017. Based on these confidence intervals, safe set SS may be defined:

$$S_n := \left\{x \in \mathcal{X}\colon \mu_n(x) - \beta_n\sigma_n(x) \geq 0\right\} \cup \{x_0\}.$$

This safe set SS may contain parameters whose $\beta_n$-lower confidence bound is above the safety threshold, as well as the initial safe parameter $x_0$. Consequently, all parameters in $S_n$ may be safe, $f(x){\geq}0$ for all $x\in S_n$, with probability at least 1-8 jointly over all iterations n. In practice, it is possible for example to keep a single fixed $\beta$. The value of $\delta$ may be selected suitably for the application at hand, e.g., depending on the cost of using the computer-controlled system and the impact of using an unsafe control input.

Given the safe set $S_n$, operation Det may determine parameters in $S_n$ to evaluate in order to efficiently expand it. Conventional methods may rely on uncertainty sampling over subsets of $S_n$. SafeOpt-based approaches may for example use an explicit Lipschitz assumption on $f$, and a corresponding Lipschitz constant, to identify parameters in $S_n$ that may expand the safe set, and select the parameter that has the biggest uncertainty among those. Interestingly, various techniques proposed herein instead use an information gain measure to identify parameters that allow to efficiently learn about the safety of parameters outside of the safe set $S_n$.

In particular, determination operation Det may guide the safe exploration by using an information-theoretic criterion. This allows to directly exploit the properties of GPs to learn about the safety of parameters outside of $S_n$. In particular, the current control input CCI may be determined to be maximally informative about the safety of other parameters, in particular of those where it is currently uncertain whether they are safe or not. To this end, the current control input CCI may be determined based on a mutual information MI, 440, between two random variables (also known as stochastic variables). The first random variable may represent the constraint quantity resulting from the current control input CCI. This may be a random variable with a numeric outcome. Of this random variable, a noisy measurement COM may be obtained by the controlling Ctrl. The second random variable may indicate whether a further control input FCI, 432 is safe. This may be a random variable with a binary outcome: safe or not safe.

The further control input FCI is illustrated in the figure as belonging to the unsafe parameters USP. The further control input FCI may not be constrained to be inside the safe set SS, but typically, it is not constrained to lie outside of the safe set either. Accordingly, one or more further control inputs FCI selected during the controlling can be safe parameters SP, or in principle even elements of the safe set ss known to be likely safe, or the current control input CCI itself.

The mutual information MI may effectively represent an information gain of controlling the computer-controlled system according to the current control input CCI. Mathematically, the second random variable may be represented as the binary variable $\Psi(x) = \mathbb{1}_{\{f(x)\geq 0\}}$, which is equal to one iff $f(x)\geq 0$. Its entropy may be defined as:

$$H_n[\Psi(z)] = -p_{\bar{n}}(z)\ln(p_{\bar{n}}(z)) - (1 - p_{\bar{n}}(z))\ln(1 - p_{\bar{n}}(z))$$

where $$p_{\bar{n}}(z)$$

is the probability of z being unsafe:

$$p_{\bar{n}}(z) = \frac{1}{2} + \frac{1}{2}\mathrm{erf}\left(-\frac{1}{\sqrt{2}}\frac{\mu_n(z)}{\sigma_n(z)}\right).$$

15

16

As illustrated, the second random variable $\Psi(z)$ may have high entropy when it is uncertain whether a parameter is safe or not, e.g., its entropy may decrease monotonically as $|\mu_n(z)|$ increases and as the GP posterior moves away from the safety threshold, and may also decrease monotonically as $\sigma_n(z)$ decreases and there is more certainty about the constraint. Moreover, the entropy may go to zero as the confidence about the safety of z increases, as desired.

Given the second random variable $\Psi(z)$, the mutual information MI may be defined as the mutual information $I(\{x, \gamma\}; \Psi(z))$ between the observation $\gamma$ at the current control input x and the value of $\Psi$ at the further control input z. By using as $\Psi$ an indicator function of the safe regions of the parameter space, the mutual information $I(\{x, \gamma\}; \Psi(z))$ may represent an amount of information about the safety of the further control point z gained by evaluating the safety constraint $f$ at x, averaged over possible observed values $\gamma$ of the noisy measurement of the resulting constraint quantity.

In particular, the mutual information may be denoted $I(\{x, \gamma\}; \Psi(z)) = H_n[\Psi(z)] - \mathbb{E}_\gamma[H_{n+1}[\Psi(z)|\{x, \gamma\}]]$, where $H_n[\Psi(z)]$ is the entropy of the second random variable $\Psi(z)$ representing whether the further control input is safe, according to the GP posterior at iteration n, while $H_{n+1}[\Psi(z)|\{x, \gamma\}]$ is its entropy at iteration n+1, conditioned on a measurement $\gamma$ at x at iteration n.

Interestingly, it may be observed that $I(\{x, \gamma\}; \Psi(z))$ is negligible when confidence about the safety of z is high or, more generally, whenever an evaluation at x does not have the potential to substantially change a belief about the safety of z. On the other hand, the mutual information may be large when an evaluation at x on average causes confidence about the safety of z to increase significantly.

FIG. 5b further illustrates this. The figure illustrates a posterior GP mean 531, a corresponding GP confidence interval 523, a constraint threshold 572, and a current safe set 521. The figure shows the mutual information $I_n(\{x, \gamma\}; \Psi(z))$, 540, for different current control inputs x inside the safe set 521, and for a fixed further control input z, 532, in this case outside of the safe set. The current control input may be determined by maximizing the mutual information 540 jointly over the current control input x and the further control input z. By way of illustration in this example, an RBF kernel is used to define the safe set and the mutual information. It may be observed that, in this example, the closer the current control input gets to the further control input z, the more informative the current control input is about the further control input, and so the bigger the mutual information 540 becomes. Moreover, it may be observed that the mutual information 540 in this example vanishes in the neighbourhood of previously evaluated parameters where the posterior variance (as indicated by the bandwidth of the confidence interval 523) is negligible, representing that multiple evaluations at similar control inputs provide relatively little additional information about the safety of further control inputs.

Returning to FIG. 4. Based on the mutual information MI between a current control input CCI and a further control input FCI, the exploration strategy may determine Det the current control input CCI by maximize this mutual information MI, e.g.:

$$x_{n+1} \in \operatorname{argmax}_{x \in S_n} \max_{z \in X} I_n(\{x, y\}; \Psi(z)),$$

where the further control input may be determined by jointly optimizing over x in the safe set $S_n$ and an unconstrained second parameter z.

In particular, evaluating $f$ at $x_{n+1}$ as above may maximize the information gained about the safety of a parameter $z \in \chi$, allowing to efficiently learn about parameters that are not yet known to be safe. While z can in principle lie in the whole domain, the parameters where the most uncertain about the safety constraint exists, lie outside the safe set, so that the optimization may typically result in selecting a further control input outside of the safe set. A mathematical analysis shows that, leaving z unconstrained, once the constrained controlling has learned about the safety of parameters outside the safe set, the optimization may resort to learning about the constraint function also inside $S_n$.

Interestingly, it can be shown mathematically that the described constrained controlling asymptotically converges to the maximally reachable safe set. Namely, the selection criterion forces the posterior uncertainty to decay to 0 over the safe set.

As an example, a constrained controlling of a computer-controlled system according to the provided techniques may be performed using the following algorithm:

| Algorithm. Information-Theoretic Safe Exploration |
| --- |
| Input: GP prior ($\mu_0$, k, $\sigma_v$), Safe seed $x_0$<br>for n = 0, ... do<br>    $x_{n+1} \leftarrow$ arg $\max_{x \in S_n} \max_{z \in X} I_n (\{x, y\}; \Psi(z))$<br>    $y_{n+1} \leftarrow$ f $(x_{n+1})$ + v<br>    Update GP posterior with $(x_{n+1}, y_{n+1})$ |

As illustrated in the above algorithm, the controlling may be performed over multiple iterations, for example, at least 10, at least 20, or at least 50 iterations. For example, the controlling may be performed until a stopping criterion has been reached, e.g., based on a predefined maximal number of iterations, and/or according to a convergence criterion.

FIGS. 6a-6c illustrate an example of performing a constrained controlling according to the provided techniques. As the figures illustrate, the GP's posterior mean 672-1, 672-2, 672-3 and confidence interval $\mu_n \pm \beta_n \sigma_n$ 623-1, 623-2, 623-3 at respective iterations approximate the true constraint quantity $f$, 670 based on selected data points 631-1, 631-3, 631-5, and, together with the safety threshold at zero 671, identify the current safe set $S_n$ 621-1, 621-2, 621-3. The vertical line 631-2, 631-4, 631-6 indicates the location of the next parameter $x_{n+1}$ selected by maximizing the mutual information as described herein. In this example, in the cases of FIG. 6a and FIG. 6b, a control input is selected that lies on the boundary of the corresponding safe set, but interestingly, as illustrated e.g., in FIG. 6c, also parameters inside the safe set may be selected if that provides the most information. In this example, the exploration is able to quickly discover the largest reachable safe set 620.

Returning to FIG. 4. A particularly advantageous way to determine the mutual information MI, is by approximating the entropy of the second random variable by a first-order Taylor expansion of a Gaussian distribution. Interestingly, this approximation of the mutual information may be computed analytically, in particular without numerical averaging, so that its calculation is computationally particularly efficient. In particular, it may be noted that the mutual information $I(\{x, \gamma\}; \Psi(z))$, MI, may represent an average conditioned on the noisy measurement $\gamma$, over possible values of $\gamma$. By using the proposed approximation, it can be avoided that this results in an intractable integral. Moreover, the inventors found that the proposed approximation is a close approximation of the actual entropy, which recovers almost exactly its true behaviour. In particular, the approximation may be derived by Taylor expansion of the entropy as follows:

$$H_n[\Psi(z)] \approx \ln(2)\exp\left\{-\frac{1}{\pi\ln(2)}\left(\frac{\mu_n(z)}{\sigma_n(z)}\right)^2\right\}.$$

The posterior mean at z after an evaluation at x depends linearly on $\mu_n(x)$, and the probability density of $\gamma$ depends exponentially on $$-\mu_n^2(x).$$

As a consequence, using the approximation may reduce the conditional entropy $\mathbb{E}_\gamma[H_{n+1}[\Psi(z)|\{x, \gamma\}]]$ to a Gaussian integral with an exact solution, e.g.:

$$\mathbb{F}_y[H_{n+1}[\Psi(z) \mid \{x, y\}]] = \ln(2)\sqrt{\frac{\sigma_v^2 + \sigma_n^2(x)\left(1 - \rho_n^2(x, z)\right)}{\sigma_v^2 + \sigma_n^2(x)\left(1 + c_2\rho_n^2(x, z)\right)}}$$
$$\exp\left\{-c_1\frac{\mu_n^2(z)}{\sigma_n^2(z)}\frac{\sigma_v^2 + \sigma_n^2(x)}{\sigma_v^2 + \sigma_n^2(x)\left(1 + c_2\rho_n^2(x, z)\right)}\right\},$$

where $\rho_n(x, z)$ is the linear correlation coefficient between $f(x)$ and $f(z)$, and where $c_1$ and $c_2$ are given by $c_1:=1/\ln(2)\pi$ and $c_2:=2c_1-1$. Interestingly, the mathematical guarantees about convergence mentioned in this specification, can be proven to hold also when this approximation is applied.

In particular, the provided approximation may be obtained by expanding both the exact expression, as function of $\mu_n(x)/\sigma_n(x)$, and a pure zero mean unnormalized Gaussian in $\mu_n(x)/\sigma_n(x)$, in their Taylor series, in particular around the point zero. At the second order one obtains $$H_n[\Psi(x)] = \ln(2) - \frac{1}{\pi}\left(\frac{\mu_n(x)}{\sigma_n(x)}\right)^2 + o\left(\left(\frac{\mu_n(x)}{\sigma_n(x)}\right)^2\right)$$

and $$c_0\exp\left\{-\frac{1}{2\sigma^2}\left(\frac{\mu_n(x)}{\sigma_n(x)}\right)^2\right\} = c_0 - c_0\frac{1}{2\sigma^2}\left(\frac{\mu_n(x)}{\sigma_n(x)}\right)^2 + o\left(\left(\frac{\mu_n(x)}{\sigma_n(x)}\right)^2\right).$$

By equating terms, one finds $c_0=\ln(2)$ and $\sigma^2=\ln(2)\pi/2$, which leads to approximation $$H_n[\Psi(x)] \approx \ln(2)\exp\left\{-\frac{1}{\pi\ln(2)}\left(\frac{\mu_n(x)}{\sigma_n(x)}\right)^2\right\}.$$

Interestingly, the inventors observed an almost perfect agreement between the function and its approximation, with a non-negligible difference limited to two small neighbourhoods of the $\mu/\sigma$ space.

Numerically, the maximization of the mutual information MI between the current control input CCI and the further control input FCI may be implemented as a multi-start gradient descent optimization. For this, conventional techniques can be used, e.g., the Adam optimizer may be used as described in Kingma and Ba, "Adam: A Method for Stochastic Optimization" (available at https://arxiv.org/abs/1412.6980 and incorporated herein by reference). As is conventional, such optimization methods may generally be heuristic and/or arrive at a local optimum.

In particular, the multi-start gradient descent may select a set of multiple starting pairs $\{(x_i, z_i)\}_i$; and update the respective pairs using gradient descent, e.g., for a given number of epochs. For example, the gradient descent may compute (x, z)=(x, z)+learning_rate*Grad(MutualInformation($\gamma(x),\Psi(z)$)). After the gradient descent, the pair that yields the biggest mutual information may be selected. Multi-start gradient descent is advantageous because it allows to deal well with the non-convexity of the search space (x,z). However, various other optimization techniques can also be used, e.g., a random search such as by selecting a number of random pairs (x,z) and choosing the pair that yields the biggest mutual information, or any other optimization method.

Also ensuring that the current control input lies in the safe set can be done in various ways. As a particular example, when performing (single-start or multi-start) gradient descent, the starting point(s) may be selected in the current safe set, and, during the gradient descent, updates may be discarded that bring the current control input outside the safe set. (The further control point is typically allowed to lie outside the safe set). In case the gradient step brings the current control input outside of the safe set, the update step may be ignored and the learning rate may be reduced.

To improve scalability to higher-dimensional control inputs The mutual information MI may be iteratively maximized in respective lower-dimensional subspaces. As also discussed elsewhere, the provided techniques in general provide better scalability by being able to operate in a continuous domain of control inputs. Still, determining the current control input $x_{n+1}$ may comprise solving a non-convex optimization problem with twice the dimension of the parameter space. To solve this optimization problem more efficiently, it is possible to perform the optimization by, in an iteration, selecting a lower-dimensional subspace, e.g., a random one-dimensional subspace. and restricting the optimization for this iteration to the selected subspace. For example, a dimension of at least 10 can be supported in this way.

While the above examples have mainly focussed on maximizing the mutual information MI between the current control input CCI and a single further control input FCI, it is also possible to average the mutual information MI over multiple further control inputs. Averaging over a finite set of further control inputs is possible by generalizing the above techniques, e.g., by determining and optimizing over mutual information between the current control input CCI and multiple further control inputs FCI. It is also possible to average over a continuous domain of further control inputs, e.g., the domain of all possible control inputs. Mathematically, this may correspond to substituting the inner max in the formula for $x_{n+1}$ with an average over the continuous domain, e.g., the domain $\chi$. The resulting integral may be approximated for example by a Monte Carlo approximation. Although averaging over a domain may in principle provide the largest information gain, still, in many cases, determining the current control input CCI based on a single further control input FCI may be preferred due to its computational efficiency, and because it was found in practice that a current control input CCI determined in this way also typically yields high average information gain over the domain, which may be due to the regularity of the involved objects.

Accordingly, the mutual information MI effectively provides an optimization signal that encourages safe exploration to gain knowledge about safety about further control inputs. Generally, this optimization can be combined with other optimization signals in various ways, e.g., an optimization signal to optimize an objective function, etc.

In particular, the constrained controlling described herein may be combined with the training of a control model for controlling the computer-controlled system. Such training may be performed by Bayesian optimization, and reinforcement learning in particular. For example the control model may be trained based on a model of the computer-controlled system as a Markov Decision process, as is conventional.

Generally, such training of a control model can be performed simultaneously with, and/or subsequent to the constrained controlling described herein. In particular, the current control input CCI may be determined both based on the mutual information MI, and based on the Bayesian optimization (BO). By combining the mutual information-based acquisition function described herein with a BO acquisition function, it is possible to expand the safe set SS and look for the optimum within the safe set at the same time. In particular, the current control input may be determined based further on an upper confidence bound acquisition function as is conventional for BO. Instead or in addition, the constrained optimization described herein may be used to determine a safe set SS as defined by the obtained control inputs and corresponding noisy measurements, the safe set being used in a subsequent Bayesian optimization to find an optimum within the discovered safe set.

Generally, the control model being trained, can be any suitable control model parameterized by a set of parameters. For example, the model may be a neural network. Neural networks are also known as artificial neural networks. Examples include deep neural networks and convolutional neural networks. In this case, the set of parameters may comprise weights of nodes of the neural network. For example, the number of layers of the model may be at least 5 or at least 10, and the number of nodes and/or weights may be at least 1000 or at least 10000. Depending on the particular application, various conventional architectures for neural networks and other machine learnable models may be used.

In addition to the trainable parameters of the model per se, the model may be defined by one or more hyperparameters, which may be optimized by the Bayesian optimization.

Some particular instantiations and experimental results of the provided techniques are now discussed.

In one experiment, the provided techniques were applied to a constraint quantity defined by samples from a Gaussian Process (GP), and the results were compared against the exploration part of StageOpt, as defined in Y. Sui et al., "Stagewise safe Bayesian optimization with Gaussian processes", proceedings ICML 2018. In StageOpt, exploration and optimization parts are performed separately: first the SafeOpt exploration strategy is used to expand the safe set as much as possible, then the objective function is optimized within the discovered safe set.

In this experiment, 100 samples were selected from a two-dimensional GP with RBF kernel, defined in [−2.5, 2.5]×[−2.5,2.5]. The proposed constrained controlling, as well as StageOpt, were run for 100 iterations for each sample. Unlike the proposed techniques, StageOpt does not operate on continuous-valued control parameters, so to apply StageOpt, the domain was discretized. This discretization was used to compare the sample efficiency of the two methods, by computing, at each iteration, what percentage of the discretized domain is classified as safe. For StageOpt run, the kernel metric has been used to compute the set of potential expanders, for different values of Lipschitz constant L.

The comparison shows that the provided techniques perform as well or better than all tested instances of StageOpt. It also shows how the choice of the hyperparameter L affects the performance of the latter, thus providing an undesirable trade-off between safety and sample efficiency in selecting this hyperparameter. It was also observed in this experiment that the provided techniques eventually explore the whole maximally reachable safe set and classify it as safe.

In a further experiment, the proposed techniques were applied to two conventional benchmarking control tasks from the OpenAI Gym framework, see G. Brockman et al., "OpenAI Gym", arXiv:1606.01540. In particular, the techniques were applied to linear controllers for the inverted pendulum and cart pole tasks.

For the inverted pendulum task, the linear controller is given by $u_t = \alpha_1 \theta_t + \alpha_2 \dot{\theta}_t$, where $u_t$ is the control signal at time t, while $\theta_t$ and $\dot{\theta}_t$ are, respectively, the angular position and the angular velocity of the pendulum. Starting from a position close to the upright equilibrium, the considered controller's task is the stabilization of the pendulum, subject to a safety constraint on the maximum velocity in one episode. For a given initial controller configuration $$\alpha_0 = (\alpha_1^0, \alpha_2^0),$$

the goal is to explore the controller's parameter space, avoiding configurations that lead the pendulum to swing with a too high velocity.

The provided techniques were used to explore the $\alpha$-space of control inputs with $x_0 = \alpha_0$ and the safety constraint being the maximum angular velocity reached by the pendulum in an episode of fixed length. The constraint threshold is a finite value $\dot{\theta}_M$, and the safe parameters are those for which the maximum velocity is below $\dot{\theta}_M$. In the notation used elsewhere in this specification, this can be represented by constraint quantity $f(\alpha) = -(\max_t \dot{\theta}_t(\alpha) - \dot{\theta}_M) \geq 0$. In this experiment, using the provided techniques, substantially the whole safe set is determined within 50 iterations.

The setting for the cart pole task is similar, but the parameter space in this case has three dimensions. The controller is given by $u_t = \alpha_1 \theta_t + \alpha_2 \dot{\theta}_t + \alpha_3 \dot{s}_t$, where $\theta_t$ and $\dot{\theta}_t$ are, respectively, the angular position and angular velocity of the pole at time t, while $\dot{s}_t$ is the cart's velocity. In this case, the initial state is set to zero angular and linear velocity and with the pole close to the vertical position, with the controller's goal being of keeping the pole stable in the upright position. A combination of the three parameters $\alpha_1$, $\alpha_2$ and $\alpha_3$ is considered safe if the angle of the pole does not exceed a given threshold. This may be denoted by constraint quantity $f(\alpha) = -(\max_t \theta_t(\alpha) - \theta_M) \geq 0$, where $\theta_M$ is the maximum allowed angle. Also in this task, it was observed that the provided techniques are able to drives exploration, leading to an increasing fraction of parameters being classified as safe.

In a further experiment, the inventors verified that the provided techniques provide improved scalability in terms of the dimensionality of the control inputs. Existing techniques relying on discretization are often problematic in practice for dimensions >3. In contrast, the provided techniques were found to work well also for control inputs having four or five dimensions. By optimizing in lower-dimensional subspaces to determine the current control input, as described herein, dimensionality can be even further improved, e.g., to at least 10. In particular, the provided techniques were applied to the constraint function $f(x)=e^{-x^2}+2e^{-(x-x_1)^2}+5e^{-(x-x_2)^2}-0.2$, which has three local optima of different heights at 0, $x_1$ and $x_2$, with $x_1<x_2$, for various dimensions of $x \in \mathbb{R}^d$.

It was found that, starting from a safe seed close to the border of the safe set in the vicinity of the lowest optimum (the origin), the provided techniques manage to explore the safe set until also $x_2$ was classified as safe, also in higher-dimensions d=10,11,12. To estimate how much of the domain is classified as safe, after each ten iterations, safe UCB was performed within the current safe set. It was observed that expansion of the safe set is promoted, until also the region including the location of the highest optimum, the furthest from $x_0$, is classified as safe. Compared to StageOpt+LineBO, in this high-dimensional setting, sample efficiency is improved.

FIG. 7 shows a block-diagram of computer-implemented method 700 of constrained controlling of a computer-controlled system. The computer-controlled system may be controlled according to a control input. The control input may be considered safe if a constraint quantity resulting from the controlling of the computer-controlled system exceeds a constraint threshold. The method 700 may correspond to an operation of the control system 100 of FIG. 1. However, this is not a limitation, in that the method 700 may also be performed using another system, apparatus or device.

The method 700 may be performed in one or more iterations.

In an iteration, the method 700 may comprise, in an operation titled "ACCESS PREVIOUS DATA", accessing 710 data representing previous control inputs and corresponding previous noisy measurements of the resulting constraint quantity.

In an iteration, the method 700 may comprise, in an operation titled "DETERMINE CONTROL INPUT BASED ON MUTUAL INFORMATION", determining 720 a current control input based on the previous control inputs and the corresponding previous noisy measurements. The current control input may be determined based on a mutual information between a first random variable representing the constraint quantity resulting from the current control input and a second random variable indicating whether a further control input is safe.

In an iteration, the method 700 may comprise, in an operation titled "CONTROL", controlling 730 the computer-controlled system according to the current control input, thereby obtaining a current noisy measurement of the resulting constraint quantity.

It will be appreciated that, in general, the operations of method 700 of FIG. 7 may be performed in any suitable order, e.g., consecutively, simultaneously, or a combination thereof, subject to, where applicable, a particular order being necessitated, e.g., by input/output relations. The controlling may comprise providing control signals to an external computer-controlled system, or operating the computer-controlled system as part of the method.

The method(s) may be implemented on a computer as a computer implemented method, as dedicated hardware, or as a combination of both. As also illustrated in FIG. 8, instructions for the computer, e.g., executable code, may be stored on a computer readable medium 800, e.g., in the form of a series 810 of machine-readable physical marks and/or as a series of elements having different electrical, e.g., magnetic, or optical properties or values. The medium 800 may be transitory or non-transitory. Examples of computer readable mediums include memory devices, optical storage devices, integrated circuits, servers, online software, etc. FIG. 8 shows an optical disc 800. Alternatively, the computer readable medium 800 may comprise data 810 representing a set of previous control inputs and corresponding previous noisy measurements determined as described herein; representing a safe set determined likely to be safe based on the set of previous control inputs and corresponding noisy measurements; and/or representing a control model for controlling a computer-controlled system trained as described herein.

Examples, embodiments or optional features, whether indicated as non-limiting or not, are not to be understood as limiting the present invention.

It should be noted that the above-mentioned embodiments illustrate rather than limit the present invention, and that those skilled in the art will be able to design many alternative embodiments without departing from the scope of the present invention. Any reference signs placed between parentheses shall not be construed as limiting the present invention. Use of the verb "comprise" and its conjugations does not exclude the presence of elements or stages other than those stated. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. In the device described as including several means, several of these means may be embodied by one and the same item of hardware. The mere fact that certain measures are described separately does not indicate that a combination of these measures cannot be used to advantage.

What is claimed is:

1. A computer-implemented control method of constrained controlling of a computer-controlled system, wherein the computer-controlled system is controlled according to a control input, and wherein the control input is safe when a constraint quantity resulting from the controlling of the computer-controlled system exceeds a constraint threshold, the method comprising:

accessing data representing previous control inputs and corresponding previous noisy measurements of a resulting constraint quantity;

determining a current control input based on the previous control inputs and the corresponding previous noisy measurements to maximize mutual information over a safety of a further control input, wherein the mutual information is defined between a first random variable representing the constraint quantity resulting from the current control input and a second random variable indicating whether a further control input is safe;

approximating the mutual information by approximating an entropy of the further control input being safe by a Taylor expansion of a Gaussian distribution; and controlling the computer-controlled system according to the current control input, thereby obtaining a current noisy measurement of the resulting constraint quantity.

2. The method of claim 1, wherein the mutual information is defined according to a Gaussian Process model of the constraint quantity given the control input.

3. The method of claim 2, wherein the current control input and the further control input are determined to maximize the mutual information.

4. The method of claim 3, wherein the mutual information is maximized by a multi-start gradient descent.

5. The method of claim 1, wherein the mutual information is averaged over multiple further control inputs.

6. The method of claim 1, wherein the constraint quantity represents a safety constraint.

7. The method of claim 1, wherein the current control input is determined such that the current control input lies in a safe set of control inputs determined likely to be safe, wherein the safe set is defined based on the previous control inputs and the corresponding previous noisy measurements, and wherein the further control input does not lie in the safe set.

8. The method of claim 1, wherein the control input includes one or more continuous-valued control parameters.

9. The method of claim 1, further comprising:
training a control model for controlling the computer-controlled system by Bayesian optimization, wherein: a) the current control input is determined based on the Bayesian optimization, and/or b) the Bayesian optimization is performed subsequently to the mutual information-based controlling, using the obtained control inputs and corresponding noisy measurements.

10. The method of claim 9, wherein the current control input is determined based further on an upper confidence bound acquisition function.

11. The method of claim 9, wherein the control model is trained based on a model of the computer-controlled system as a Markov Decision process.

12. A control system for constrained controlling of a computer-controlled system, wherein the computer-controlled system is controlled according to a control input, and wherein the control input is safe if a constraint quantity resulting from the controlling of the computer-controlled system exceeds a constraint threshold, wherein the control system comprises:
a data interface configured for accessing data representing previous control inputs and corresponding previous noisy measurements of the resulting constraint quantity;
a processor subsystem configured to:
determine a current control input based on the previous control inputs and corresponding previous noisy measurements to maximize mutual information over a safety of a further control input, wherein the mutual information is defined between a first random variable representing the constraint quantity resulting from the current control input and a second random variable indicating whether a further control input is safe;
approximate the mutual information by approximating an entropy of the further control input being safe by a Taylor expansion of a Gaussian distribution; and
control the computer-controlled system according to the current control input, thereby obtaining a current noisy measurement of the resulting constraint quantity,
wherein the current control input is determined based on a mutual information between a first random variable representing the constraint quantity resulting from the current control input and a second random variable indicating whether a further control input is safe.

13. A system, comprising:
a control system; and
a computer-controlled system;
wherein the computer-controlled system is controlled according to a control input, and wherein the control input is safe if a constraint quantity resulting from the controlling of the computer-controlled system exceeds a constraint threshold, wherein the control system includes:
a data interface configured for accessing data representing previous control inputs and corresponding previous noisy measurements of the resulting constraint quantity;
a processor subsystem configured to:
determine a current control input based on the previous control inputs and corresponding previous noisy measurements to maximize mutual information over a safety of a further control input, wherein the mutual information is defined between a first random variable representing the constraint quantity resulting from the current control input and a second random variable indicating whether a further control input is safe;
approximate the mutual information by approximating an entropy of the further control input being safe by a Taylor expansion of a Gaussian distribution; and
control the computer-controlled system according to the current control input, thereby obtaining a current noisy measurement of the resulting constraint quantity,
wherein the current control input is determined based on a mutual information between a first random variable representing the constraint quantity resulting from the current control input and a second random variable indicating whether a further control input is safe.

14. A non-transitory computer-readable medium on which are stored data representing instructions for constrained controlling of a computer-controlled system, wherein the computer-controlled system is controlled according to a control input, and wherein the control input is safe when a constraint quantity resulting from the controlling of the computer-controlled system exceeds a constraint threshold, the instructions, when executed by a processor system, causing the processor system to perform:
accessing data representing previous control inputs and corresponding previous noisy measurements of a resulting constraint quantity;
determining a current control input based on the previous control inputs and the corresponding previous noisy measurements to maximize mutual information over a safety of a further control input, wherein the mutual information is defined between a first random variable representing the constraint quantity resulting from the current control input and a second random variable indicating whether a further control input is safe;
approximating the mutual information by approximating an entropy of the further control input being safe by a Taylor expansion of a Gaussian distribution; and
controlling the computer-controlled system according to the current control input, thereby obtaining a current noisy measurement of the resulting constraint quantity;
wherein the current control input is determined based on a mutual information between a first random variable representing the constraint quantity resulting from the current control input and a second random variable indicating whether a further control input is safe.

* * * * *